US008238968B1

(12) United States Patent
Frydman

(10) Patent No.: US 8,238,968 B1
(45) Date of Patent: Aug. 7, 2012

(54) CAMERA SENSOR USAGE AS LUMINANCE METER FOR POWER SAVING IN MOBILE PORTABLE DEVICES

(75) Inventor: Javier Frydman, Tel Mond (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 600 days.

(21) Appl. No.: 12/197,789

(22) Filed: Aug. 25, 2008

Related U.S. Application Data

(60) Provisional application No. 60/957,885, filed on Aug. 24, 2007.

(51) Int. Cl.
*H04M 1/00* (2006.01)

(52) U.S. Cl. ............... 455/556.1; 348/602; 250/214 A; 250/201.1; 455/566; 455/550.1; 349/61

(58) Field of Classification Search ............... 455/556.1, 455/566, 550.1; 349/61; 250/201.1, 214; 348/602
See application file for complete search history.

(56) References Cited

U.S. PATENT DOCUMENTS

| | | | | |
|---|---|---|---|---|
| 5,818,553 | A * | 10/1998 | Koenck et al. | 349/61 |
| 6,687,515 | B1 * | 2/2004 | Kosaka | 455/566 |
| 7,071,456 | B2 * | 7/2006 | Poplin | 250/214 AL |
| 7,117,019 | B2 * | 10/2006 | Abbasi | 455/566 |
| 7,292,875 | B2 * | 11/2007 | Chan et al. | 455/550.1 |
| 7,825,917 | B2 * | 11/2010 | Bryant et al. | 345/207 |
| 2005/0037815 | A1 * | 2/2005 | Besharat et al. | 455/566 |
| 2008/0006762 | A1 * | 1/2008 | Fadell et al. | 250/201.1 |

OTHER PUBLICATIONS

Rüth et al., "Ambient Light Sensors," Osram Opto Semiconductors, available at http://catalog.osram-os.com Jun. 29, 2006; p. 1-8.
Kwan, "Samsung LCD Adjusts to Ambient Light Automatically," Mobile Magazine, available at http://www.mobilemag.com/content/100/102/C12199, printed on Feb. 11, 2009.
"BlackBerry Curve 8320 Titanium w/ MyFaves," The Wireless Store, available at http://www.cellstores.com/HelperPages/PhoneDetails.aspx?, printed on Feb. 12, 2009.

* cited by examiner

*Primary Examiner* — Nick Corsaro
*Assistant Examiner* — Sowmini Nair

(57) ABSTRACT

A battery powered electronic appliance, including a first device, a visual display and a camera device having a camera sensor that is configured to sense ambient light in the environment of the electronic appliance; an ambient light measurement module coupled to the camera sensor that is configured to measure the sensed ambient light to produce an ambient light value that indicates a measured level of ambient light; and a light control module that is configured to determine a level of illumination of the visual display based on the ambient light value.

38 Claims, 6 Drawing Sheets

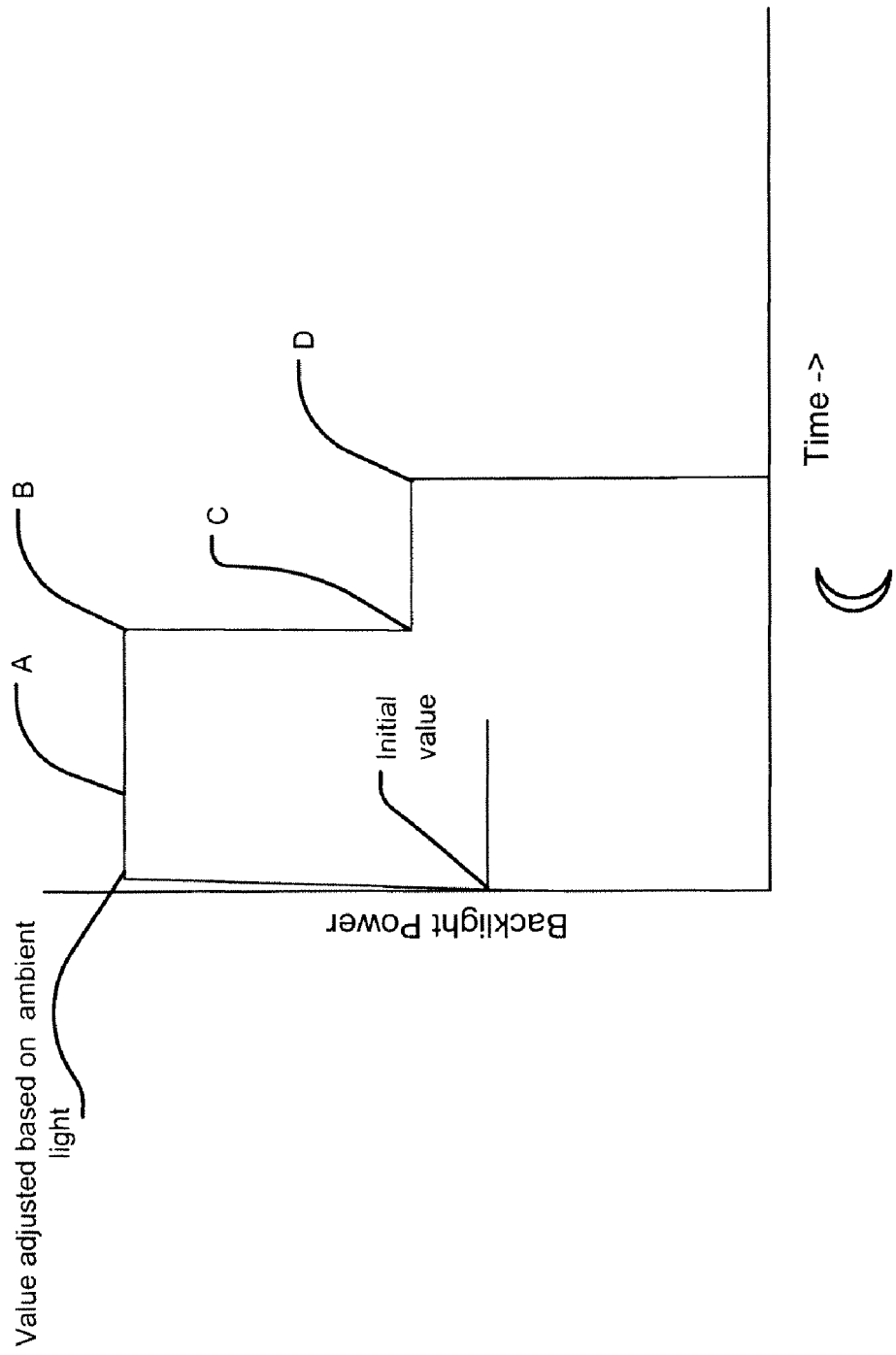

CAMERA SENSOR USAGE AS LUMINANCE METER FOR POWER SAVING IN MOBILE PORTABLE DEVICES

CROSS-REFERENCES TO RELATED APPLICATIONS

The present application claims the benefit of U.S. Provisional Patent Application No. 60/957,885, entitled "Camera Sensor Usage as Luminance Meter for Power Saving in Mobile Portable Devices," filed on Aug. 24, 2007, the entire disclosure of which is incorporated by reference herein in its entirety.

FIELD OF TECHNOLOGY

The present disclosure relates generally to adjusting the light emission of electronic appliances including electronic devices, such as a visual display, according to levels of detected ambient light.

BACKGROUND

Many portable electronic appliances include a camera and associated camera features in addition to another device or otherwise in addition to the appliance's primary design features. For example, a mobile phone may include a camera in addition to a cellular phone device. Cameras include sensors which are conventionally used as an exposure meter for determining how much light should fall on the photographic medium when taking a photograph.

These portable electronic appliances use portable power sources, such as a rechargeable battery. However, the battery power is a limited resource and it is important to conserve the power of the portable power source of these portable appliances. Other appliances are designed for reduced power consumption, for example in order to be more "green". Generally, input/output (I/O) devices, such as an illuminated keyboard or a display screen of an electronic appliance, are principle consumers of power in portable electronic appliances and may quickly consume the power of the battery. Illuminated keyboards, display screens, and other similar visual devices enable a user to more easily utilize the visual device. Accordingly, there exists a need to balance the illumination of the visual display with efficient consumption of the limited battery resource. Adjusting the illumination levels of the visual display may help to conserve the power source.

SUMMARY OF THE DISCLOSURE

In one embodiment, an electronic appliance, comprising: a first device, a visual display and a camera device having a camera sensor that is configured to sense ambient light in the environment of the electronic appliance an ambient light measurement module coupled to the camera sensor that is configured to measure the sensed ambient light to produce an ambient light value that indicates a measured level of ambient light; and a light control module that is configured to determine a level of illumination of the visual display based on the ambient light value. The appliance may be battery powered.

In another embodiment, a method of method of controlling light emission of a visual display in an electronic appliance having a first device and a camera device, the method comprising: sensing ambient light in the environment of the electronic appliance, with a camera sensor that is coupled to the camera device; measuring the ambient light based on the ambient light sensed by the camera sensor; determining an ambient light value based on the measured ambient light; and setting a visual display illumination level that corresponds to an amount of light to emit from the visual display based on the ambient light value.

In another embodiment, a computer program product that includes a computer medium having a sequence of instructions which, when executed by a processor, causes the processor to execute a process for controlling light emission of a visual display in an electronic appliance having a first device and a camera device, the process comprising: sensing ambient light in the environment of the electronic appliance, with a camera sensor that is coupled to the camera device; measuring the ambient light based on the ambient light sensed by the camera sensor; determining an ambient light value based on the measured ambient light; and setting a visual display illumination level that corresponds to an amount of light to emit from the visual display based on the ambient light value.

In another embodiment, a mobile phone comprising: an antenna; a transceiver coupled to the antenna; a speaker coupled to the transceiver; a microphone coupled to the transceiver; a portable power source; an input/output (I/O) device; a camera device having a camera sensor; an ambient light measurement module configured to measure a level of ambient light based on an output of the camera sensor; and a light control module configured to determine a visual display level based on the level of ambient light, wherein the level of illumination of the visual display indicates a level of illumination to be applied to the visual display.

BRIEF DESCRIPTION OF THE DRAWINGS

FIG. 5 is a graph diagram of backlight power values that change over time, in the example case of text messaging, in a low ambient light level environment, in accordance with an embodiment of the disclosure.

DETAILED DESCRIPTION

Embodiments of a system, appliance, computer program product, or method described herein may be used to enable any electronic appliance having an integrated camera and visual display, such as test equipment, measuring equipment, medical equipment, a mobile computer, a mobile phone, a personal digital assistant (PDA), a camcorder, a GPS system, electronic book readers, video games, MP3 Players and interne pods (iPods), viewing screens, etc., and any electronic appliance which may benefit from reduced power consumption, for example battery powered electronic appliances, to consume less power in lighting its components, such as a visual display (keypad and/or display screen) based on the amount of ambient light detected by a camera sensor coupled to the appliance. Although embodiments of the disclosure are specifically described in the context of a battery powered appliance, such as a mobile phone, it is noted that described systems and methods for the reduction of power consumption may be suitable, for example whenever more environmentally friendly ("green") devices are desired.

In an embodiment of the disclosure, an electronic appliance, such as a mobile phone, may include a camera unit having a camera sensor where the camera, and the camera sensor in particular, is also coupled to a light emission controller module which is used to control the light emission of an electronic appliance. An example of the light emission of an electronic appliance includes the backlight of a visual display, such as a display screen or keypad. Reducing the amount of power supplied to the backlight of the visual display, for example, when a bright backlight is not needed by the user, facilitates efficient power consumption. Use of the camera sensor for both the camera functionality and the light emission control functionality may also reduce the cost of the materials for the production of the mobile phone, as compared to electronic appliances that use a dedicated ambient light sensor separate from the camera.

Figure 1:
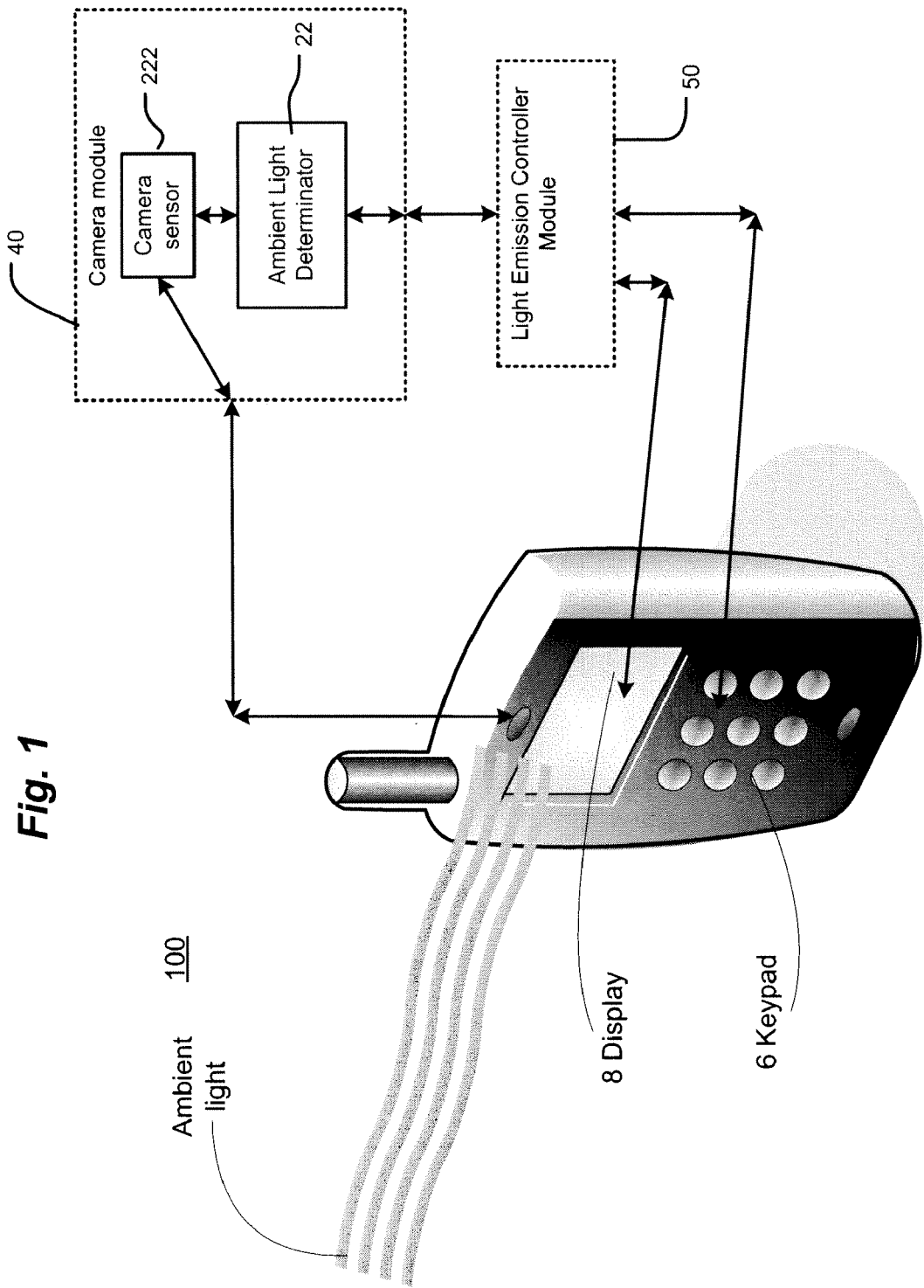
FIG. 1 is a diagram illustrating a mobile phone having a camera sensor coupled to a light emission controller module, in accordance with an embodiment of the disclosure.

An example embodiment of disclosure is shown in FIG. 1. For example, an electronic appliance, such as a mobile phone 100 (including a cell phone) includes a camera module 40 having an integrated camera sensor 222 coupled to an ambient light determinator module 22. The ambient light determinator module 22 may include an analog-to-digital converter and any other circuit logic which the camera sensor 222 may not provide. The camera module 40 is coupled to a light emission controller module 50 which may be configured to control a level of backlighting at a keypad 6, a display 8 or both. Examples of integrated camera sensors 222 that may be used with embodiments described herein include a phototransistor, a photodiode, and an opto hybrid, a pixel array, etc, or any other suitable camera sensor. For example, some common types of camera sensors include an analog sensor and a digital sensor, such as a Charge Coupled Device (CCD) sensor, a Complimentary Metal-Oxide Semiconductor Device (CMOS) sensor, and a Foveon X3 sensor.

In a CCD sensor, the charge is transported across the sensor chip and read at one corner of the array of the sensor. An analog-to-digital converter turns each pixel's value into a digital value. In most CMOS devices, there are several transistors at each pixel that amplify and move the charge using more traditional wires. The CMOS approach enables each pixel to be read individually. The Foveon sensor relies on the photoelectric properties of semiconductors, however, each photocell actually has three semiconductor receptors, buried at different and precisely calculated depths in the silicon wafer. These sensors types or any other suitable photo sensor may be used with embodiments described herein.

In general, light or photo sensors convert energy from photons into electric current or voltage. The camera sensor 222 senses ambient light within the environment of the electronic appliance, and generates photonic data. As seen in FIG. 1, ambient light in the environment of mobile phone 100 that is detected by the camera sensor 222 and measured by the ambient light measurement module 22 may be used by the light emission controller 50 to control the light level of at least one visual display, such as the keypad 6 or display screen 8 of the mobile phone 100.

Brightness is a term that describes how intense a light source is perceived by the human eye or a camera sensor. Intensity is a term that can be used to describe the level of ambient light perceived by the camera sensor 222, where ambient light is typically considered to be background "noise" that is not attributed to a specific source. Brightness or intensity may be measured in units called a LUX (lumen per square meter). However, other suitable units or levels of measurement of ambient light may also be used in accordance with the embodiments disclosed herein. Table 1 below lists the brightness of some every day light sources. One lumen represents the total flux of light emitted, equal to the intensity in candelas multiplied by the solid angle in steradians (¼π of a sphere) into which the light is emitted. Thus, the total flux of a one-candela light, if the light is emitted uniformly in all directions, is 4π lumens.

TABLE 1

| Light Source | Brightness (LUX) |
| --- | --- |
| candle (from 1 meter) | 1 |
| street light | 20 |
| office desk lighting | 750 |
| overcast day | 3,000 |
| overcast sunny day | 20,000 |
| direct sunlight | 100,000 |

Figure 2:
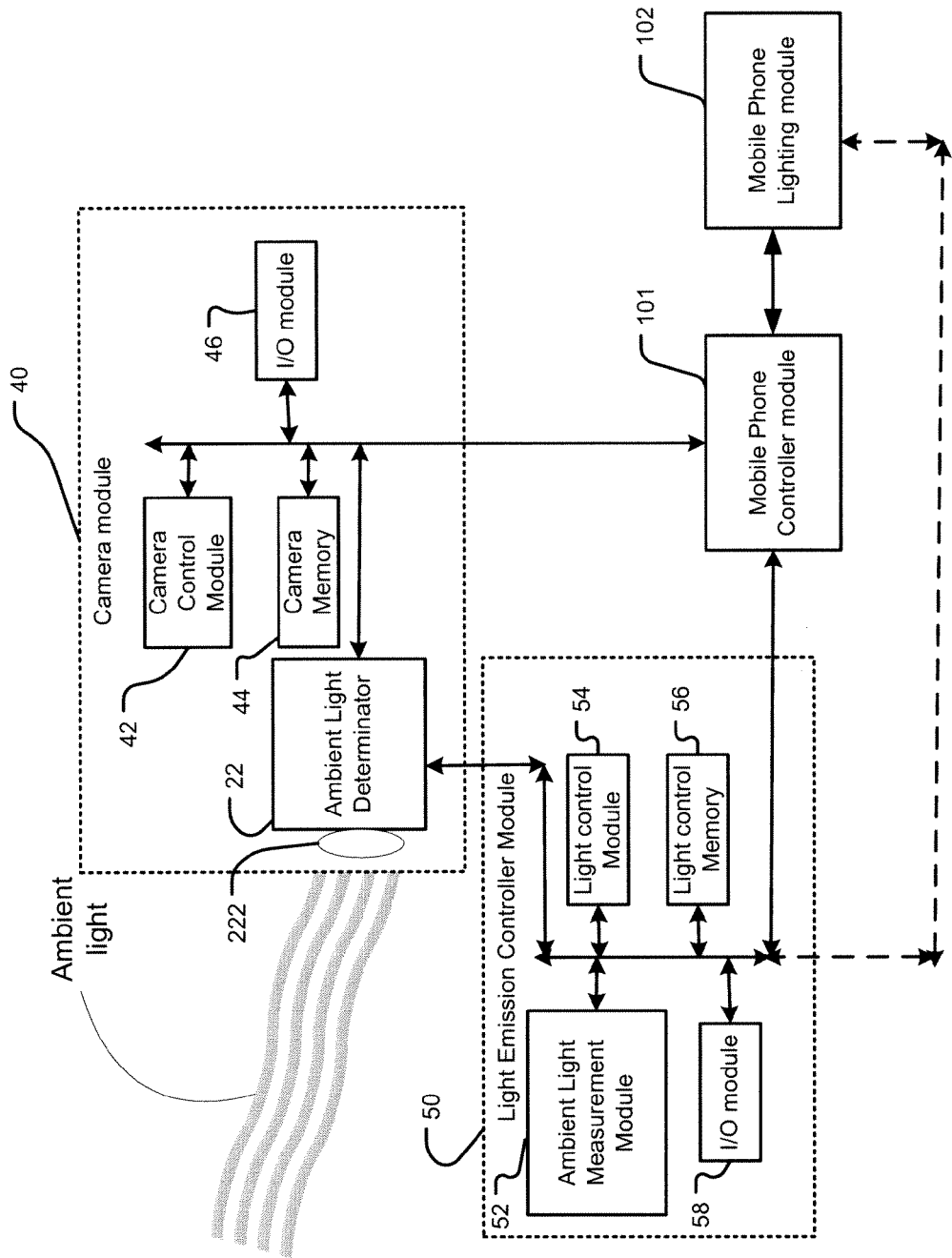
FIG. 2 is a block diagram of a system for controlling light emission of an electronic appliance, such as a mobile phone, having an input device (keypad and/or touch screen) and an output display screen device, in accordance with an embodiment of the disclosure.

As illustrated in FIG. 2, the camera sensor 222 is integrated within a camera module 40 that is coupled to a light emission controller module 50. Ambient light information may be received by the ambient light determinator module 22 which may optionally include circuitry for generating a processed output signal for the light emission controller module 50. The camera sensor 222, alone, or in combination with the ambient light determinator module 22, may detect the ambient light in the environment of an appliance, such as a mobile phone 100 or 300 (FIG. 3), and send a signal to the light emission controller module 50. Optionally, a light control module 54 may continuously monitor for a threshold of change in the signal generated by the light determinator module 22. If a threshold is achieved, then the light control module 54 may initiate a measurement of the detected ambient light by way of an ambient light measurement module 52, which may function as a light meter. Although shown as being included with the light emission controller module 50, the ambient light measurement module 52 may be integrated as part of the ambient light determinator 22. It is noted that although the ambient light determinator 22, light control module 54 and ambient light measurement module 52 are each shown separately, each of these modules may be integrated into a single unit providing the respective functionalities.

The sensor 222 of the ambient light measurement module 22 may detect any suitable wavelength range of light. For instance, human eyes detect a wavelength range, namely from 400 nm to 700 nm with the peak sensitivity at 560 nm.

The ambient light measurement module 22 may work with filters or other techniques which improve the reading of the ambient light levels by, for example, removing flicker caused by ambient fluorescent light or other alternating current powered lamps. Optionally, the light emission controller module 50 may process the signal generated by ambient light measurement module 22 to compensate for flicker, for example.

The ambient light measurement module 22 and/or camera sensor 222 may include a microlense, a light pipe, a funnel, or other waveguide devices, or a combination of these devices (not shown) which are used to enhance the light gathering ability of the camera sensor 222. For example, a digital camera sensor may have a plurality of photosites which collect and store photons in their respective cavities. These cavities may not be spaced directly next to each other in order to accommodate other electronics. In order to direct light which does not directly fall into the cavities of the camera sensor 222 to the cavities, a microlense may be used above each photosite. The microlenses direct photons, which would otherwise have been unused, into the photosite.

The ambient light determinator module 22 may generate an indication of the amount of ambient light received by the camera sensor 222. The camera module 40 may be configured to use the ambient light determinator module 22 to generate images. The same output signal or different output signals may be used by the light emission controller module 50 and by the camera module 40. In one example, light may strike pixels or other sensor units of the camera sensor 222 to generate a specific electric charge according to the intensity of the light per sensor unit, for example, or other configuration for absorbing photon energy. The charge associated with each sensor unit signal or summation of sensor unit signals, such as a pixel, may be converted to a digital value. An ambient light measure may be generated based on digital values generated per sensor unit or pixel. Based upon the sensor unit values, or a multiple of the sensor unit values, or pixel values, a conversion may be done by the ambient light measurement module 22, camera control module 42, or ambient light measurement module 52 to generate a standard ambient light measurement or a proprietary ambient light measurement. For example, the ambient light measurement may be generated based on an accumulation and/or average of the digital values corresponding to the sensor units or pixels. The calculation of the accumulation and/or average may be performed by camera control module 42, the ambient light determinator module 22, or the ambient light measurement module 52. The calculation may be implemented in hardware, software, and/or firmware. Alternatively, an analog circuit could generate a sum or average signal of the charges corresponding to the sensor units or pixels. Alternatively, any of the functions described herein may be distributed across other modules of the electronic appliance.

The camera module 40 may include a dedicated camera control module 42 which is configured to control the camera module 40. A dedicated camera memory 44 may be used to store any images generated by the camera module 40. Additionally, the camera module 40 may have other input/output capabilities such as camera specific processing and camera related user interface. An example of camera specific processing which is used to interface with the user is a specifically designed camera user interface (I/O) module 46. In accordance with this disclosure, the sensor 222 and ambient light determinator 22 may be used by the light emission controller module 50, even when the camera module 40 is not otherwise being utilized, for example, to take pictures.

The dedicated camera modules, 42, 44, 46 may alternatively be shared with similar functioning phone modules or may be distributed otherwise with similar functioning modules of the phone 200.

An output of the ambient light determinator 22 or camera sensor 222 may include an indication of the intensity of ambient light, such as an ambient light measurement. The output of the ambient light determinator module 22 may be used as an input to the light control module 54. The light control module 54 may use a transfer function or look up table to relate the detected intensity of ambient light to how much power should be applied towards the light emission of the visual display, so as to achieve a desired brightness of display screen 8 and/or keypad 6 (FIG. 1), for example. Examples of transfer functions which may be used with embodiments of this disclosure include the transfer functions illustrated in FIGS. 6A to 6C, which are later described in detail.

Figure 6A:
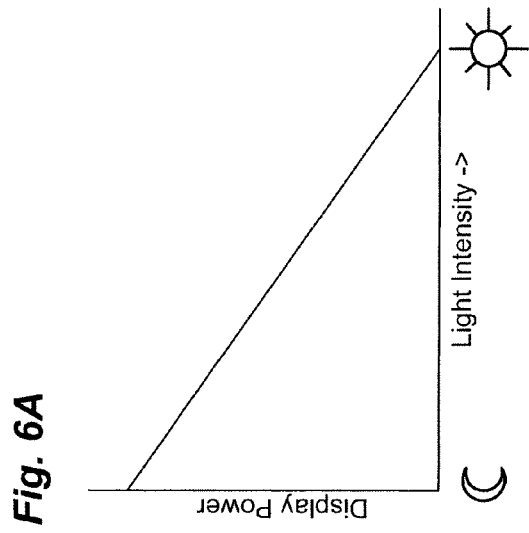
FIGS. 6A to 6C are graph diagrams of example transfer functions which show a relationship between an output of display power values and an input of ambient light intensity values, in accordance with an embodiment of the disclosure.
Figure 6B:
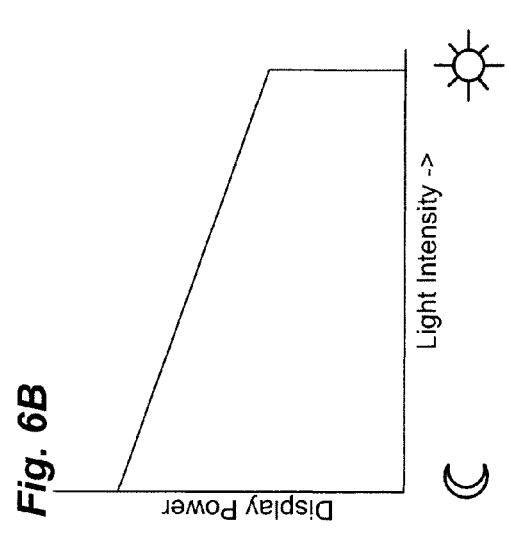
Figure 6C:
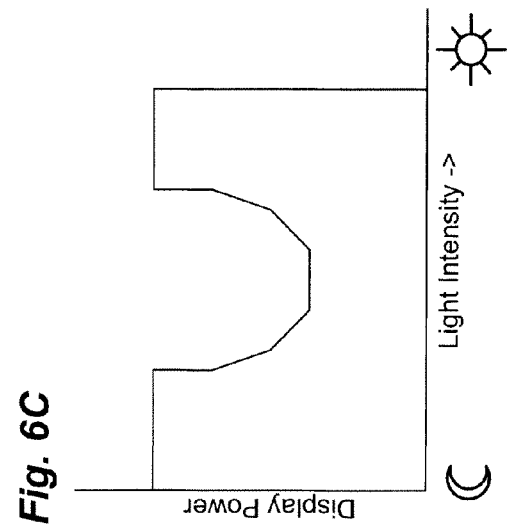

The ambient light measurement module 52 may process the signal from the ambient light determinator 22 further. Alternatively, the signal from the ambient light determinator 22 may be sent directly to the light control module 54. The light control module 54 may read any suitable analog or any digital output from the ambient light measurement module 22 and produce an output according to any desired transfer function (i.e., as shown in FIGS. 6A-6C, etc.) or a look up table. The output from the ambient light measurement module 22 may be provided to the ambient light measurement module 52 of the light emission controller module 50. Based on the measured intensity of ambient light, the light emission controller module 50 may send control signals to the mobile phone controller module 101 so that the mobile phone controller module 101 may control in effect the amount of power supplied to an electronic appliance (i.e., mobile phone) lighting module 102, such as a display screen 8 and/or keypad 6, to control the brightness of light that is emitted from the mobile phone lighting module 102. Alternatively, control signals may go directly to the mobile phone lighting module 102 and bypass mobile phone controller module 101.

The light emission controller module 50 may have a dedicated memory 56 and a dedicated I/O module 58 associated with it or may share its memory and I/O functionality with the overall mobile phone 200.

A user may be able to set the display brightness directly and thus override any light emission controller module 50 functionality via a light control I/O module 58. This information may be stored in a dedicated light control memory 56.

The dedicated light control modules, 52, 56, and 58 may alternatively be shared with similar functioning phone modules or may be distributed otherwise with similar functioning phone modules. For example, the mobile phone 200 may have a memory device which is shared between processing modules, such as the light emission controller module 50 and the general mobile phone architecture. Alternatively, there may be only one general processor used by all of the phone modules, including the light emission controller module 50, and the ambient light measurement module 22, and all other functionality may be implemented in software.

Figure 3:
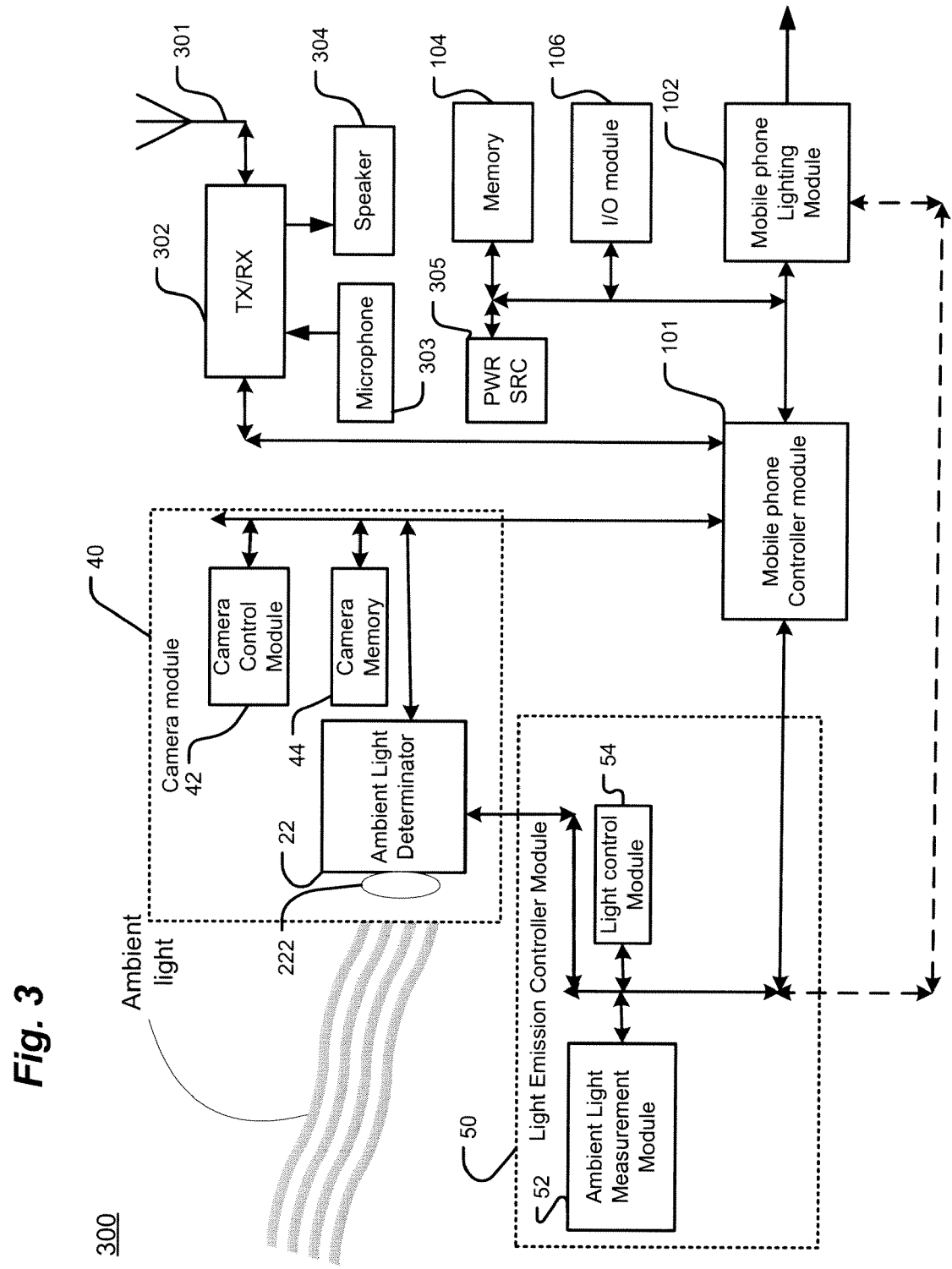
FIG. 3 is a block diagram of a system for controlling light emission of an electronic appliance, such as a mobile phone, having an input device (keypad and/or touch screen) and an output display screen device, in accordance with another embodiment of the disclosure.

FIG. 3 shows a mobile appliance 300 in accordance with another embodiment of the disclosure, where the power source 305, memory 104 and/or I/O module 106 may be shared function modules between the mobile phone 300 and the light emission controller module 50. In this embodiment, the memory 104 and I/O module 106 do not have a dedicated functionality for either or both of the camera module 40 and/or the light emission controller module 50. FIG. 3 also shows additional components of a mobile phone (not all components listed are necessary components) including antenna (optionally including multiple antennas that are not shown) 301, Transceiver (TX/RX) 302, microphone 303, speaker 304, power source (PWR SRC) 305, mobile phone lighting module 102, and a separate processor for controlling the functions of the mobile phone (i.e., Mobile phone controller module 101) and all functions interoperating with the mobile phone functionality. The electronic appliance (mobile phone) controller module 101 may be the only mobile phone processor or may be a separate module dedicated to integrating between the modules. These additional components are generally understood by those of ordinary skill in the art based on the foregoing description, and need not be described further herein. Other aspects of the structure and functionality corresponding to electronic appliance (i.e., mobile phone 200) are shown in FIG. 2.

Figure 4:
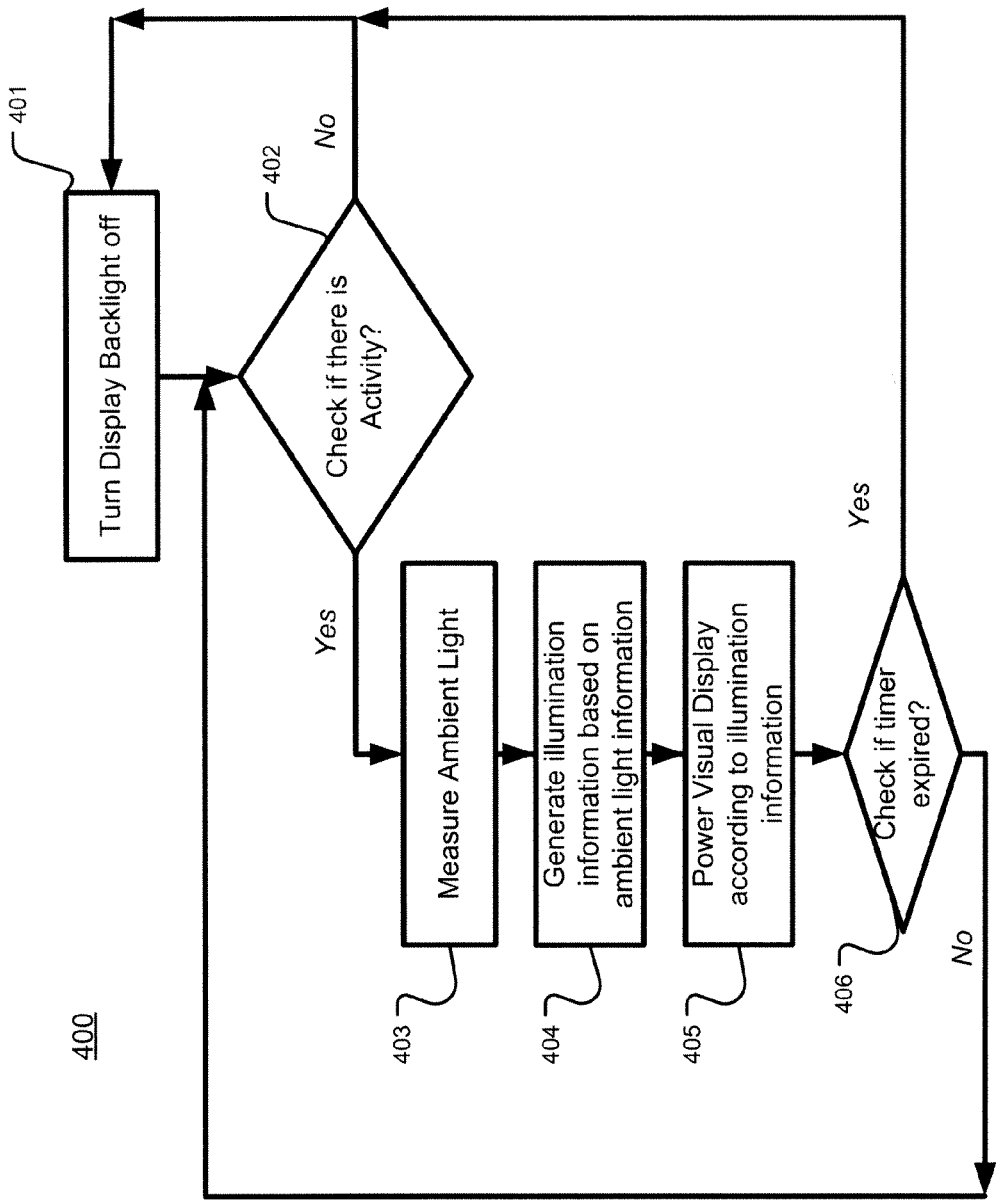
FIG. 4 is a flow diagram of a method of controlling the light emitted from a visual display of an electronic appliance, in accordance with an embodiment of the disclosure.

FIG. 4 shows an embodiment of a method of the disclosure which may be implemented by any electronic appliance, such as any of the mobile phones 100, 300, shown and described above. A display backlight will be turned off and remain off (401) while there is no detected activity in the electronic appliance (402) or after a timer has expired (406). The activity may include powering on the electronic appliance, transitioning from a sleep mode to an active mode, manipulating an I/O device of the electronic appliance, activating a function of the appliance, or by any other suitable activity that involves the visual display. If activity is detected (402), then ambient light is measured (403) by the ambient light determinator 22. Based on the amount of ambient light received, the light emission controller module 50 generates the illumination information which may be used to light an electronic device (404), such as a visual display. The ambient light information may be converted into a level of power to be supplied to the visual display, or a desired level of display brightness by, for example, using a lookup table or any function, such as the functions described later corresponding to FIGS. 6A-6C, or a similar function. Based on the illumination information, for example, a backlight, or any other suitable device, etc. of the visual display is powered (405) to reduce or increase the level of light emission of the visible display so that the user can more easily view the visual display. Such visual displays include but are not limited to a keypad, a display screen, a touch screen, etc., and other suitable visual displays. The brightness of the visual display may be timed (406) so that it may be suitably increased or reduced after a predetermined time interval based on the current function/state or based on the last detected activity.

In one embodiment, whether there is inactivity or activity occurring between the user and the device may be detected by any means available, for example touch activation, voice activation, or any other data input technique. For example, activity may be detected by a module that keeps track of the last input submitted to the device by the user along with a timer. The timer may be set based on the type of electronic device being used or the functionality of the device being used.

FIG. 5 is an illustration of an example of how the light emission based on controlled display power may vary over time in accordance with an embodiment of the disclosure. For example, the mobile phone 300 may be used for text messaging functionality in a low ambient light condition, such as a movie theater environment. When a user presses an individual button of the keypad 6, an activity detection module may indicate that activity is present or has occurred.

After activity associated with the mobile phone 300 is detected, the power level may increase from an initial starting value until a power corresponding to detected ambient light level is determined. The display 8 and keypad 6 may light up and remain at a certain fixed level of light emission (A to B) for as long as activity associated with the mobile phone 30 is detected and while the level of ambient light intensity in the environment surrounding the mobile phone 30 remains within a predetermined range. For example, when in a movie theater, the initial power value may quickly ramp up from the default power level to a higher power level which is based upon the detected level of ambient light in the movie theater. If the user is using the text messaging service of the mobile phone, then the activity timer, for example, in the case of text messaging, may be set for 20 seconds. If the last input activity was made at time A, then brightness of the display screen may be controlled to be illuminated at the same power level until time B. At time B, for example, after 20 seconds of inactivity, the display brightness may be reduced so that the display will still be visible but at a dimmed level, as shown at time C. If still after an additional time interval, for example 20 additional seconds, no new activity is detected, then the display screen may be turned off, as illustrated in FIG. 5 as occurring after time D.

FIGS. 6A-6C show examples of transfer functions suitable in determining a brightness of a visual display as a function of ambient light intensity in accordance with embodiments of the disclosure. The transfer function of FIG. 6A may be used to set the display power level to a maximum level when in a low ambient light environment. As the intensity of ambient light increases, the level of power supplied by the light emission controller module to the display is reduced in a linear function until a maximum intensity of ambient light is detected, at which point no light emission may be required from the display. For instance, light emission power may vary linearly as a function of ambient light brightness where the function has a negative slope and the light emission power eventually reduces to zero. The transfer function of FIG. 6A may be a graph that can be used to assign effective power levels for controlling light emitted from a keypad 6, for example.

The transfer function of FIG. 6B may be used to set the visual display power level to a maximum level when in a low ambient light environment. As the intensity of ambient light increases, the level of power supplied by the light emission controller module to the display is reduced until a maximum intensity of ambient light is detected, at which point a minimum level of light emission may be required from the display. Alternatively to the transfer function of FIG. 6A, the transfer function of FIG. 6B stops at a minimum display power level. The transfer function of FIG. 6B may be a graph that can be used to assign effective power levels for controlling the light emission of any electronic appliance including a display 8, for example.

The transfer function of FIG. 6C may be used to at the display power level to a higher level in both very low levels and very high levels of an ambient light intensity. For example, in direct sunlight it may be difficult to see a display screen 8 due to a high reflection occurring off of the display 8. It may be beneficial to increase the effective display power level to a maximum no that the light emission from the display may be visible despite the high reflection occurring off of the display 8. This curved, non-linear, transfer function may be more or less continuous than shown in FIG. 6C, for example. Also, any custom transfer function relating ambient light intensity with, for example, a display power level or any other electronic device power level may be programmed, in accordance with embodiments of the disclosure. Also, any custom transfer function relating ambient light intensity with power level may be used in accordance with any one of a specified user input or downloaded from a network or other input source.

It is noted that at least some of the various blocks, modules, operations, techniques, and functionality described above may be implemented in any of the other modules described herein or any hardware, firmware, software, or any combination of hardware, firmware, and/or software. When implemented in software or firmware, the software or firmware may be stored in any suitable computer readable memory.

When implemented in hardware, the hardware may comprise one or more of discrete components, an integrated circuit, an application-specific integrated circuit (ASIC), etc.

While the present disclosure has been described with reference to specific examples, which are intended to be illustrative only and not to be limiting of the disclosure, it will be apparent to those of ordinary skill in the art that changes, additions or deletions in addition to those explicitly described above may be made to the disclosed embodiments without departing from the spirit and scope of the disclosure.

Embodiments disclosed herein may also include any features described in the background section, existing in conventional systems, and/or developed, which may be equivalents to elements described in this specification.

What is claimed is:

1. A multi-function electronic appliance, comprising:
    a visual display;
    a camera device to capture images when the multi-function electronic appliance is being used in a camera mode, wherein the camera device includes a camera sensor that is configured to sense ambient light in the environment of the multi-function electronic appliance;
    a controller coupled to the visual display, wherein the controller is configured to control functions of the multi-function electronic appliance, including functions associated with non-camera modes of the multi-function electronic appliance;
    an ambient light measurement module coupled to the camera sensor to produce an ambient light value using the camera sensor associated with the camera device when the multi-function device is not in the camera mode, the ambient light value indicates a measured level of ambient light;
    a light control module that is configured to determine a level of illumination of the visual display, based on the ambient light value, when the multi-function device is not in the camera mode; and
    a transfer function module configured to associate the ambient light value with the level of illumination of the visual display according to a relationship between the ambient light value and the level of illumination of the visual display, wherein
        when the ambient light value is at a first value, the level of illumination of the visual display is set to a first level,
        when the ambient light value is at a second value, the level of illumination of the visual display is set to a second level, wherein the second value is greater than the first value, and
        when the ambient light value is at a third value above the first value and below the second value, the level of illumination of the visual display is set to a third level that is below the first level and below the second level.

2. An appliance according to claim 1, wherein the level of illumination of the visual display corresponds to illumination by a viewing screen backlight.

3. An appliance according to claim 2, wherein the level of illumination of the visual display corresponds to a display brightness.

4. An appliance according to claim 1, wherein the level of illumination of the visual display corresponds to illumination by a keypad backlight.

5. An appliance according to claim 1, wherein the light control module is further configured to select the level of illumination of the visual device from a look up table that includes ambient light values, each associated with a level of illumination of the visual display.

6. An appliance according to claim 1, wherein the light control module is further configured to associate an ambient light value with the level of illumination of the visual display.

7. An appliance according to claim 1, wherein the electronic appliance is any one of the group of appliances having a built in camera, the group consisting of: test equipment, measuring equipment, medical equipment, a mobile computer, a mobile phone, a personal digital assistant (PDA), a camcorder, a GPS system, a mobile phone, an electronic book reader, a video game, an MP3 Player, an internet pods (iPod), and a viewing screen.

8. An appliance according to claim 1, wherein the level of illumination of the visual display is selected from among a plurality of non-zero levels.

9. An appliance according to claim 1, further comprising a flicker compensating module configured to compensate for flicker in the ambient light.

10. An appliance according to claim 1, wherein the camera sensor is any one of the group consisting of: an analog sensor, a digital sensor, a phototransistor, a photodiode, an opto hybrid sensor, a CCD sensor, CMOS sensor, and a Foveon sensor.

11. An appliance according to claim 1, further comprising a transfer function module that is configured to associate the ambient light value with the level of illumination of the visual display.

12. An appliance according to claim 11, wherein the transfer function module is any one of the group consisting of: a user specified transfer function, a downloaded transfer function, and a transfer function originating from a source outside of the electronic appliance.

13. An appliance according to claim 1, further comprising a transfer function module configured to associate the ambient light value with the level of illumination of the visual display according to a linear relationship between the ambient light value and the level of illumination of the visual display.

14. A method of controlling light emission of a visual display in a multi-function electronic appliance having a controller to control functions of the multi-function electronic appliance, including functions associated with non-camera modes of the multi-function electronic appliance, wherein the multi-function electronic appliance also includes a camera device to capture images when the multi-function electronic appliance is operating in a camera mode, the method comprising:
    sensing ambient light in the environment of the electronic appliance with a camera sensor associated with the camera device when the multi-function electronic appliance is not in the camera mode;
    measuring the ambient light based on the ambient light sensed by the camera sensor when the multi-function electronic device is not in the camera mode;
    determining an ambient light value based on the measured ambient light measured using the camera sensor when the multi-function electronic device is not in the camera mode;
    setting a visual display illumination level that corresponds to an amount of light to emit from the visual display based on the ambient light value when the multi-function electronic device is not in the camera mode; and
    associating the ambient light value with the visual display illumination level based on a relationship between the ambient light value and the visual display illumination level, wherein
        when the ambient light value is at a first value, the visual display illumination level is at a first level,
        when the ambient light value is at a second value, the visual display illumination level is at a second level, wherein the second value is greater than the first value, and when the ambient light value is at a third value above the first value and below the second value, the visual display illumination level is at a third level that is below the first level and below the second level.

15. A method according to claim 14, wherein setting the visual display illumination level comprises controlling a display backlight based on the visual display illumination level.

16. A method according to claim 14, wherein setting the visual display illumination level comprises controlling a keypad backlight based on the visual display illumination level.

17. A method according to claim 14, wherein setting the visual display illumination level comprises selecting the visual display illumination level from a look up table that includes ambient light values, each associated with a visual display illumination level.

18. A method according to claim 14, wherein setting the visual display illumination level comprises selecting the visual display illumination level using a function configured to associate ambient light values with the visual display illumination levels.

19. A method according to claim 14, wherein the electronic appliance is any one of the group of appliances having a built in camera, the group consisting of: test equipment, measuring equipment, medical equipment, a mobile computer, a mobile phone, a personal digital assistant (PDA), a camcorder, a GPS system, a cell phone, an electronic book reader, a video game, an MP3 Player, an internet pods (iPod), and a viewing screen.

20. A method according to claim 14, further comprising selecting the visual display illumination level from among a plurality of non-zero levels.

21. A method according to claim 14, wherein determining the ambient light value comprises compensating for flicker in the ambient light.

22. A method according to claim 14, wherein sensing ambient light comprises sensing using a camera sensor selected from the group consisting of: an analog sensor, a digital sensor, a phototransistor, a photodiode, an opto hybrid sensor, a CCD sensor, CMOS sensor, and a Foveon sensor.

23. A method according to claim 14, further comprising associating the ambient light value with the visual display illumination level, using any one of the group consisting of: a user specified transfer function, a downloaded transfer function, and a transfer function originating from a source outside of the electronic appliance.

24. A method according to claim 14, further comprising associating the ambient light value with the visual display illumination level based on a linear relationship between the ambient light value and the visual display illumination level.

25. A computer program product that includes a non-transitory computer readable medium having a sequence of instructions which, when executed by a processor, causes the processor to execute a process for controlling light emission of a visual display in a multi-function electronic appliance having a controller to control functions of the electronic appliance, including functions associated with non-camera modes of the multi-function electronic appliance, wherein the multi-function electronic appliance also includes a camera device to capture images when the multi-function electronic appliance is being used in a camera mode, the process comprising:

sensing ambient light in the environment of the electronic appliance with a camera sensor associated with the camera device when the multi-function device is not in the camera mode;

measuring the ambient light based on the ambient light sensed by the camera sensor when the multi-function electronic device is not in the camera mode;

determining an ambient light value based on the measured ambient light measured using the camera sensor when the multi-function electronic device is not in the camera mode;

setting a visual display illumination level that corresponds to an amount of light to emit from the visual display based on the ambient light value determined when the multi-function electronic device is not in the camera mode; and associating the ambient light value with the visual display illumination level based on a relationship between the ambient light value and the visual display illumination level, wherein
when the ambient light value is at a first value, the visual display illumination level is at a first level,
when the ambient light value is at a second value, the visual display illumination level is at a second level, wherein the second value is greater than the first value, and
when the ambient light value is at a third value above the first value and below the second value, the visual display illumination level is at a third level that is below the first level and below the second level.

26. A computer program product according to claim 25, wherein setting the visual display illumination level comprises controlling a display backlight based on the visual display illumination level.

27. A computer program product according to claim 25, wherein setting the visual display illumination level comprises controlling a keypad backlight based on the visual display illumination level.

28. A computer program product according to claim 25, wherein setting the visual display illumination level comprises selecting the visual display illumination level from a look up table that includes ambient light values, each associated with a visual display illumination level.

29. A computer program product according to claim 25, wherein setting the visual display illumination level comprises selecting the visual display illumination level using a function configured to associate ambient light values with the visual display illumination levels.

30. A computer program product according to claim 25, wherein the electronic appliance is any one of the group of appliances having a built in camera, the group consisting of: test equipment, measuring equipment, medical equipment, a mobile computer, a mobile phone, a personal digital assistant (PDA), a camcorder, a GPS system, a cell phone, an electronic book reader, a video game, an MP3 Player, an internet pods (iPod), and a viewing screen.

31. A computer program product according to claim 25, further comprising selecting the visual display illumination level from among a plurality of non-zero levels.

32. A computer program product according to claim 25, wherein determining the ambient light value comprises compensating for flicker in the ambient light.

33. A computer program product according to claim 25, wherein sensing ambient light comprises sensing using a camera sensor selected from the group consisting of: an analog sensor, a digital sensor, a phototransistor, a photodiode, an opto hybrid sensor, a CCD sensor, CMOS sensor, and a Foveon sensor.

34. A computer program product according to claim 25, further comprising associating the ambient light value with the visual display illumination level using any one of the group consisting of: a user specified transfer function, a downloaded transfer function, and a transfer function originating from a source outside of the electronic appliance.

35. A computer program product according to claim 25, further comprising associating the ambient light value with the visual display illumination level based on a linear relationship between the ambient light value and the visual display illumination level.

36. A multi-function electronic appliance comprising:
- an antenna;
- a transceiver coupled to the antenna;
- a speaker coupled to the transceiver;
- a microphone coupled to the transceiver;
- a portable power source;
- an input/output (I/O) device;
- a controller configured to control functions of the multi-function electronic appliance, including functions associated with non-camera modes of the multi-function electronic appliance;
- a camera device configured to capture images when the multi-function electronic appliance is being used in a camera mode, wherein the camera device includes a camera sensor, wherein the camera sensor is configured to sense ambient light in the environment of the multi-function electronic appliance;
- an ambient light measurement module coupled to the camera sensor, the ambient light measurement module configured to measure a level of ambient light based on an output of the camera sensor when the multi-function electronic device is not in the camera mode;
- a light control module configured to determine a visual display level based on the level of ambient light, wherein the level of illumination of the visual display indicates a level of illumination to be applied to the visual display when the multi-function electronic appliance is not in the camera mode; and
- a transfer function module configured to associate the ambient light value with the level of illumination of the visual display according to a relationship between the ambient light value and the level of illumination of the visual display, wherein
  - when the ambient light value is at a first value, the level of illumination of the visual display is set to a first level,
  - when the ambient light value is at a second value, the level of illumination of the visual display is set to a second level, wherein the second value is greater than the first value, and
  - when the ambient light value is at a third value above the first value and below the second value, the level of illumination of the visual display is set to a third level that is below the first level and below the second level.

37. A mobile phone according to claim 36, wherein the visual display comprises a display screen.

38. A mobile phone according to claim 36, wherein the visual display comprises an illuminated keyboard.

\* \* \* \* \*